US006792658B2

(12) United States Patent
Capoferi et al.

(10) Patent No.: US 6,792,658 B2
(45) Date of Patent: Sep. 21, 2004

(54) VALVE SEAL REMOVAL APPARATUS

(76) Inventors: Thomas D. Capoferi, 57250 New Haven Rd., New Haven, MI (US) 48048; Fred L. Capoferi, 11175 Erdmann, Starling Heights, MI (US) 48314

( * ) Notice: Subject to any disclaimer, the term of this patent is extended or adjusted under 35 U.S.C. 154(b) by 35 days.

(21) Appl. No.: 10/200,739

(22) Filed: Jul. 24, 2002

(65) Prior Publication Data

US 2004/0016096 A1 Jan. 29, 2004

(51) Int. Cl.[7] .................................................. B23P 19/04

(52) U.S. Cl. ........................................... 29/255; 29/235

(58) Field of Search .......................... 29/255, 254, 268, 29/235, 221

(56) References Cited

U.S. PATENT DOCUMENTS 1,492,462 A * 4/1924 Hoy ............................ 29/254

* cited by examiner

*Primary Examiner*—Robert C. Watson
(74) *Attorney, Agent, or Firm*—Hall, Myers, Vande Sande & Pequignot

(57) ABSTRACT

Apparatus for removing valve seals from a cylinder head of an engine. More particularly, valve seal removal apparatus having a lever and at least a pair of gripping members for frictionally gripping a portion of a valve seal.

10 Claims, 3 Drawing Sheets

VALVE SEAL REMOVAL APPARATUS

FIELD OF INVENTION

This invention relates to apparatus for removing valve seals from a cylinder head of an engine. More particularly, this invention relates to valve seal removal apparatus having a lever and at least a pair of gripping members for frictionally gripping a portion of a valve seal.

BACKGROUND OF INVENTION

The replacement of failed valve seals in an automotive (or other type) engine (failed valve seals causes oil consumption and smoke emissions) is a time consuming and expensive process. In such a repair, however, the labor cost is typically considerably greater than the cost of any necessary parts, particularly because of the inaccessibility of the valve seals and the labor required to reach them. For example, in addition to the time and labor required for the removal of (and reassembly of) the valve covers, pushrods, rocker arms, the head from the engine block, and the keepers and valve springs, the removal of valve seals using prior art tools and/or techniques can take upwards of 60–70 minutes. This is due, in part, to the difficulty of successfully "grasping" typical valve seals (which are located in a small, narrow space and are often stuck on the head due to heat and deposits) with known tools and applying the necessary threshold force required for removal without the tool slipping from the seal or damaging the valve guide or lifter bore. In addition to these problems, prior art tools often can only accommodate a narrow range of valve seal diameters which vary widely.

Because of the high labor costs associated with valve seal replacement, the causative difficulty and time required in removing them, and the restrictive nature of some prior art valve seal removal tools with respect to valve seal diameter and location (in a narrow port), it is apparent that there exists a need in the art for a valve seal removing tool which overcomes, mitigates, or solves the above problems in the art. It is a purpose of this invention to fulfill this and other needs in the art which will become more apparent to the skilled artisan once given the following disclosure.

SUMMARY OF THE INVENTION

Generally speaking, this invention fulfills the above-described needs in the art by providing: valve seal removal apparatus comprising:

- a longitudinal body having a shaft extending substantially coaxially therefrom;
- a lever member pivotally attached proximal a first end of the longitudinal body;
- a first gripping means having a first gripping member located thereon;
- a second gripping means having a second gripping member located substantially opposed to the first gripping member, the second gripping means being pivotally attached proximal the first end of the longitudinal body, the lever being capable of operating the second gripping means such that the second gripping means is biased in a direction towards or away from the first gripping means;
- a stop member located along a length of the shaft;
- an impact member located slidably on the shaft for impacting the stop member.

In another embodiment, there is provided: in a tool for removing valve seals from a valve guide on a cylinder head, the tool including a gripping end for gripping a portion of a valve seal and a slide hammer for impacting a stop mechanism and imparting an axial force on a valve seal in order to remove the valve seal from a valve guide, the improvement comprising:

- a gripping means including at least one biasable member, the gripping means further including at least a first and second piercing member, the first and second piercing members located substantially opposite one another for frictionally gripping a portion of a valve seal;
- a first handle portion;
- a lever for multiplying an applied force pivotally connected proximal the first handle portion and further including a second handle portion, the lever being operable by the second handle portion in order to articulate the biasable member between at least a first and second position;
- a shaft extending from the first handle portion and including a stop mechanism located thereon;
- a slide hammer slidably located on the shaft for impacting the stop mechanism and imparting an axial force to the tool.

DETAILED DESCRIPTION OF CERTAIN EMBODIMENTS

Figure 1:
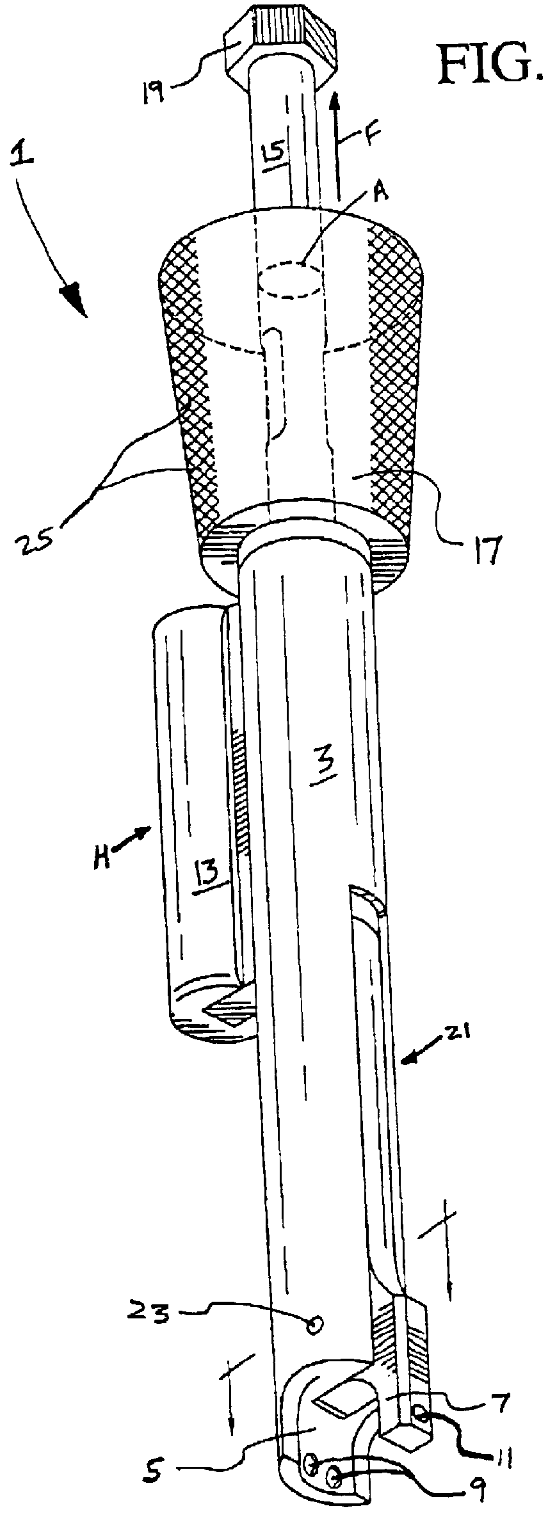
FIG. 1 is a three-dimensional, perspective view of one embodiment of the valve removal apparatus according to the subject invention with certain parts shown in x-ray.
Figure 2:
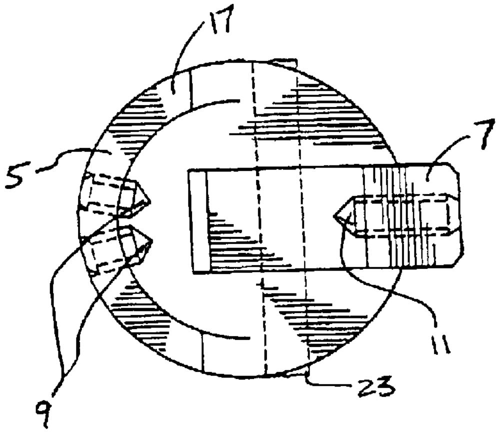
FIG. 2 is an end plan view of the embodiment of the invention illustrated in FIG. 1 with certain parts shown in x-ray.
Figure 3:
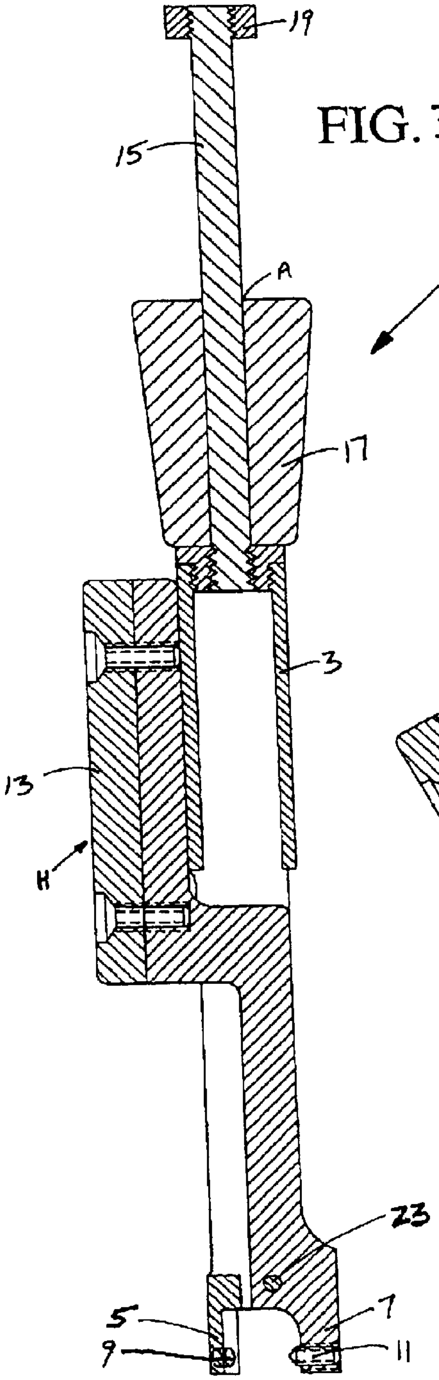
FIG. 3 is a profile plan view of the embodiment illustrated in FIG. 1.

Referring initially to FIG. 1, therein is illustrated one example of a valve seal removal apparatus according to the subject invention. As illustrated, valve seal removal apparatus 1 comprises a longitudinal body 3 serving as both a frame for the device as well as a handle for a user. Pivotally connected to longitudinal body 3 is lever 13 which, as described in detail below, is provided to impart a gripping force on a valve seal to be removed, and, furthermore, serves as an additional handle portion during operation. In order to minimize the profile of the apparatus for operating within the narrow confines of a cylinder head, lever cavity 21 is provided so that a portion of lever 13 nests within longitudinal body 3.

First and second gripping means 5 and 7 are provided as well as gripping members 9 and 11 for securely engaging the side walls of a valve seal (shown in FIGS. 5 and 6 as 30) when lever 13 is operated. Gripping means 5 is integral to one end of longitudinal body 3 and gripping means 7 extends from lever 3 at an end opposite handle portion "H". Gripping members 9 and 11 are attached or integral to gripping means 5 and 7 and, in this embodiment, are comprised of conical metal bodies having sharp points for frictionally grasping or piercing a portion of a valve seal body. Other embodiments serving the same purpose are, of course, contemplated.

Extending from the other end of longitudinal body 3 is shaft 15 which serves as a travel guide for impact member (i.e. slide hammer) 17. Impact member 17 comprises a cylindrical metal body which includes an aperture through which shaft 15 extends, and over which impact member 17 is slidably moveable. Stop member 19 is attached proximal the free end of shaft 15 and serves as a stop which imparts a force to the assembly 1 when contacted by impact member 17 during valve seal removal (described in detail below). Stop member 19, in this embodiment, is simply a nut threaded onto the end of shaft 15 but may alternatively be any structure which will retain as well as resist the force of impact member 17.

Figure 5:
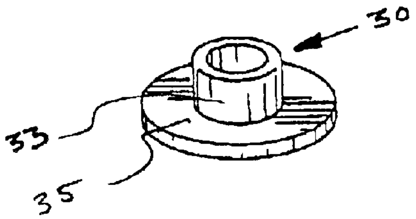
FIG. 5 is a three-dimensional, perspective view of a conventional valve seal shown with certain parts removed for sake of clarity.
Figure 6:
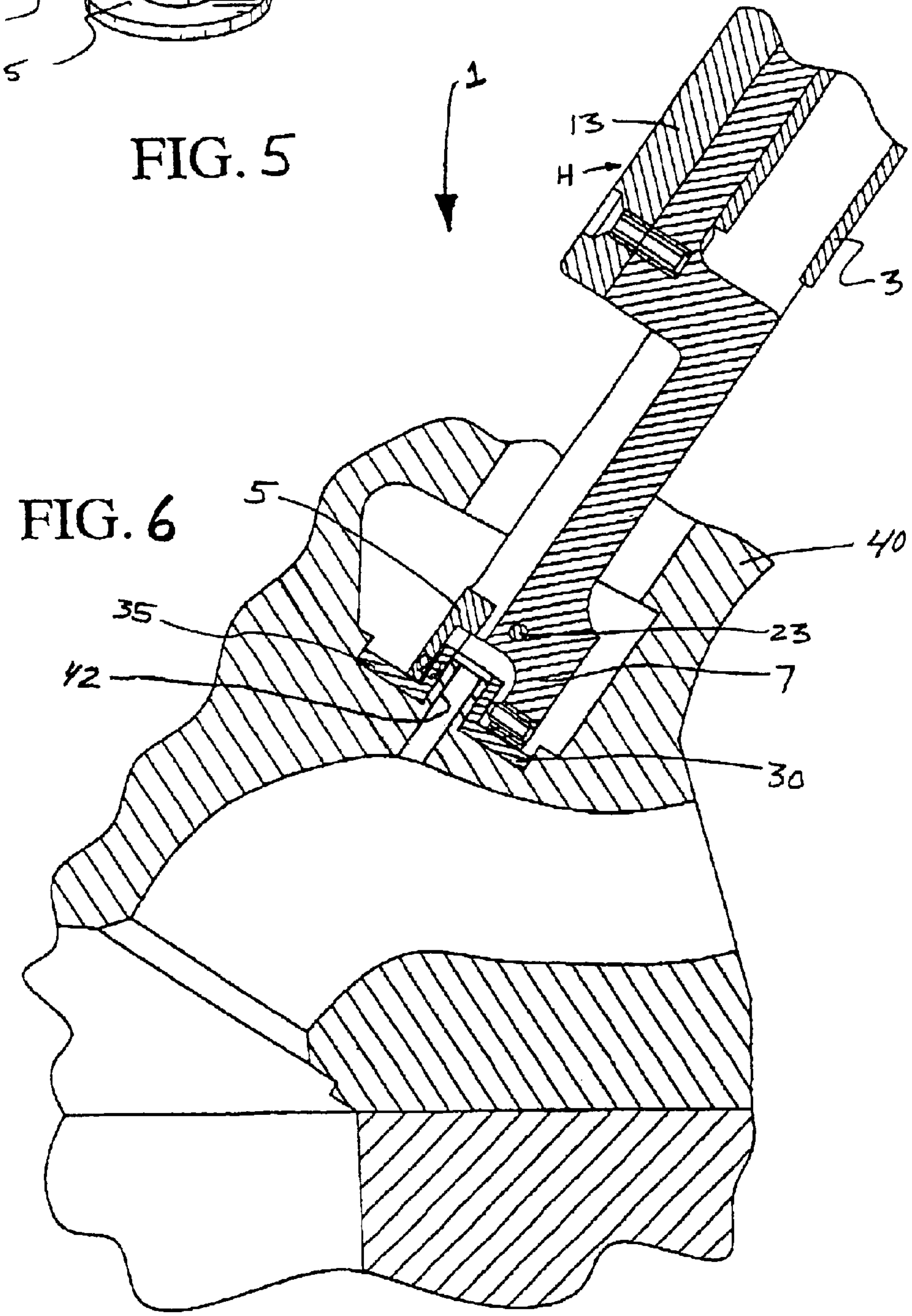
FIG. 6 is a side plan view of the valve seal according to FIG. 5 shown seated on a conventional cylinder head and with the valve removal apparatus according to FIG. 1 shown in position for valve seal removal.

Turning now to FIGS. 5 and 6, therein is shown an example of a conventional valve seal (of "top hat" design) 30 both alone and installed on a cylinder head 40 (with other valve parts shown removed). In an automotive (or other type) engine, a valve seal 30 regulates the amount of oil which reaches the valve guide in order to lubricate the contact points between the valve guide and valve stem during engine operation. As such, a valve seal 30 contains many parts and features (e.g. a compression wire, a compression band, sealing materials, etc.) not shown in the subject drawings for sake of clarity. Most valve seals, however, include a seal body 33 and an annular flange 35 surrounding the seal body. In addition, each valve seal has an aperture through which a valve stem is inserted therethrough during valve train assembly.

Figure 4:
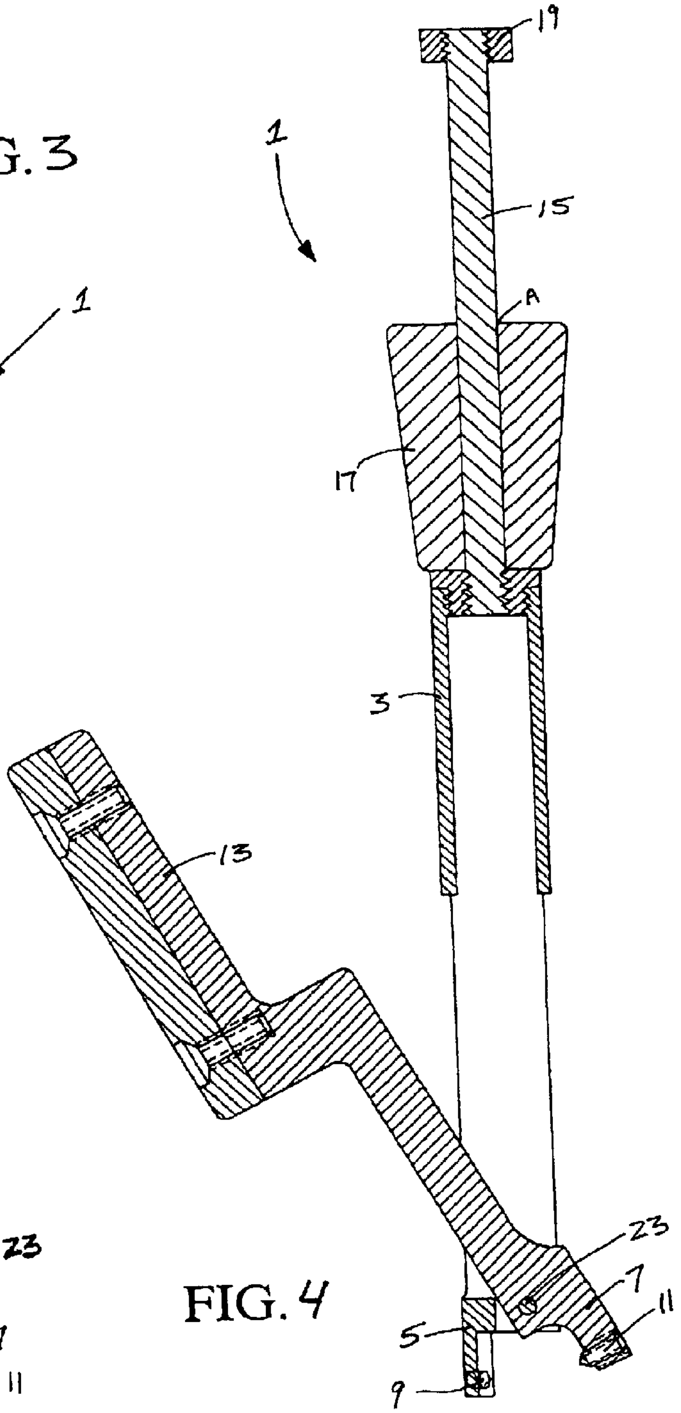
FIG. 4 is a profile plan view of the embodiment illustrated in FIG. 1 shown with the lever member in operation.

In the process of removing a valve seal (or set of valve seals) with the unique tool of the subject invention, the initial conventional process of removing the valve covers, pushrods, the head from the engine block, springs, etc. is first commenced so that the seals are exposed for access by the removing tool. Thereafter, in order to remove the installed valve seal from its raised guide 42 (see FIG. 6) on cylinder head 40, the valve seal removal apparatus is inserted into the cylinder head with lever 13 in the open position as illustrated in FIG. 4. It is noted, in this regard, that the position of lever 13 and thus the position of gripping means 7 (which is controlled by lever 13) is exaggerated in this figure in order to illustrate the operation of the gripping mechanism. In practice, lever 13 is operated only far enough so that the valve seal will fit within the space between gripping mean 5 and 7, and lever 13's travel, in this respect, is limited by the size of the passageway of the cylinder head. Thus, in a slightly open position, valve removal apparatus 1 is maneuvered such that valve seal 30 (and thus valve seal body 33) is oriented between gripping means 5 and 7. Once in position as such, lever 13 is again operated, but in the opposite direction towards longitudinal body 3, so that gripping members 9 and 11 contact valve seal body 33. Once in contact, lever 13 is operated further and in the same direction so that gripping members 9 and 11 begin to crimp or pierce valve seal body 33 to a small degree. The ideal amount of crimp or pierce is normally determined by feel and, as such, is learned from experience when performing this operation. However, care must be taken when operating the lever so that excessive force is not imparted lest the valve guide be damaged (the lever multiplies the force applied by the hand by approximately 9 fold in certain designs).

Once the valve seal body is properly secured in the "teeth" of the gripping members, a pulling force must be applied to apparatus 1 so that the seal can be removed. Impact member (i.e. slide member) 17 is employed for this purpose, by 1) holding valve seal removal apparatus 1 with one hand about longitudinal body 3 as well as holding handle portion "H" of lever 13 with the same hand (so that a gripping force is maintained on the seal) 2) and, with the other hand, grasping impact member 17 (provided with knurls 25 for better gripping ability) and then rapidly impacting the slide hammer (impact member 17) against stop member 19. This action imparts an axial force (in a direction indicated by arrow "F" in FIG. 1) along the length of apparatus 1 (and thus to gripping members 9 and 11) which, of course, is typically sufficient to remove the valve seal from guide 42 (although successive impacts may be required). It will be noticed at this point in the procedure that, when employing the slide hammer, gripping members 9 and 11 hold securely to the valve seal without slippage as often occurs when employing prior art removal devices. This feature (gained by the use of the lever, the gripping members, and the lack of flex in the gripping portion of the apparatus) enables valve seals to be removed in a time which is up to 20 times less than that required with conventional valve seal removal techniques or tools. Thus, improved time efficiency as well as decreased labor costs are achieved when employing the valve seal removal apparatus described herein.

Once given the above disclosure, many other features, modifications, and improvements will become apparent to the skilled artisan. Such other features, modifications, and improvements are therefore considered to be a part of this invention, the scope of which is to be determined by the following claims:

We claim:

1. Valve seal removal apparatus comprising:

a longitudinal body having a shaft extending substantially coaxially therefrom;

a lever member pivotally attached proximal a first end of said longitudinal body;

a first gripping means having a first gripping member located thereon;

a second gripping means having a second gripping member located substantially opposed to said first gripping member, said second gripping means being operatively connected to said lever member, said lever member being capable of operating said second gripping means such that said second gripping means is biased in a direction towards or away from said first gripping means;

a stop member located along a length of said shaft;

an impact member located slidably on said shaft for impacting said stop member; and wherein said longitudinal body includes a cavity extending through a portion thereof thereby to receive a portion of said lever as said lever is operated.

2. The valve seal removal apparatus of claim 1 wherein said first and second gripping members comprise piercing bodies for frictionally gripping a portion of a valve seal.

3. The valve seal removal apparatus of claim 2 wherein said first and second gripping members are conically shaped.

4. The valve seal removal apparatus according to claim 3 further including a third gripping member.

5. The valve seal removal apparatus according to claim 1 wherein the distance between said first and said second gripping means is variable by the operation of said lever thereby to accommodate various sized valve seals.

6. The valve seal removal apparatus according to claim 1 wherein said second gripping means extends integrally from a portion of said lever.

7. The valve seal removal apparatus according to claim 1 wherein when a valve seal is oriented between said first and said second gripping members, said lever may be operated thereby to bias said second gripping member against a portion of the valve seal thereby to grip the valve seal between said first and said second gripping members.

8. The valve seal removal apparatus according to claim 7 wherein when said impact member is slidably impacted against said stop member, said impact member imparts an axial force to said longitudinal body in a direction to effect the removal of the valve seal from a cylinder head.

9. The valve seal removal apparatus according to claim 1 wherein said lever member is capable of multiplying the force imparted to a valve seal by lever operation by a factor of approximately 9.

10. In a tool for removing valve seals from a valve guide on a cylinder head, said tool including a gripping end for gripping a portion of a valve seal and a slide hammer for impacting a stop mechanism and imparting an axial force on a valve seal in order to remove the valve seal from a valve guide, the improvement comprising:

a gripping means including at least one biasable member, said gripping means further including at least a first and second piercing member, said first and second piercing members located substantially opposite one another for frictionally gripping a portion of a valve seal;

a first handle portion;

a lever for multiplying an applied force pivotally connected proximal said first handle portion and further including a second handle portion, said lever being operable by said second handle portion in order to articulate said biasable member between at least a first and second position;

a shaft extending from said first handle portion and including a stop mechanism located thereon;

a slide hammer slidably located on said shaft for impacting said stop mechanism and imparting an axial force to said tool; and wherein said longitudinal body includes a cavity extending through a portion thereof thereby to receive a portion of said lever as said lever is operated.

* * * * *